United States Patent
Andonian et al.

(10) Patent No.: US 11,081,918 B2
(45) Date of Patent: *Aug. 3, 2021

(54) ELECTRIC MACHINE HAVING A ROTOR WITH RETAINING SLEEVE

(71) Applicant: Calnetix Technologies, LLC, Cerritos, CA (US)

(72) Inventors: Archie A. T. Andonian, Huntington Beach, CA (US); Patrick McMullen, Villa Park, CA (US)

(73) Assignee: Calnetix Technologies, LLC, Cerritos, CA (US)

( * ) Notice: Subject to any disclaimer, the term of this patent is extended or adjusted under 35 U.S.C. 154(b) by 752 days.

This patent is subject to a terminal disclaimer.

(21) Appl. No.: 15/499,323

(22) Filed: Apr. 27, 2017

(65) Prior Publication Data
US 2018/0316246 A1    Nov. 1, 2018

(51) Int. Cl.
*H02K 1/27* (2006.01)
*H02K 11/01* (2016.01)
*H02K 9/22* (2006.01)

(52) U.S. Cl.
CPC .......... *H02K 1/278* (2013.01); *H02K 11/012* (2020.08); *H02K 9/22* (2013.01)

(58) Field of Classification Search
CPC .......... H02K 1/278; H02K 9/22; H02K 11/01
USPC ..................................... 310/156.28
See application file for complete search history.

(56) References Cited

U.S. PATENT DOCUMENTS

| 4,433,261 | A | * | 2/1984 | Nashiki | H02K 1/278 310/156.28 |
| 4,633,113 | A | * | 12/1986 | Patel | H02K 15/03 310/156.28 |
| 4,910,861 | A |  | 3/1990 | Dohogne |  |
| 4,930,201 | A |  | 6/1990 | Brown |  |
| 5,175,461 | A | * | 12/1992 | Zigler | H01F 41/0253 310/156.28 |
| 6,047,461 | A | * | 4/2000 | Miura | H02K 1/278 29/596 |

(Continued)

OTHER PUBLICATIONS

Non-final office action issued in U.S. Appl. No. 15/499,407 dated Feb. 28, 2020, 21 pages.

(Continued)

*Primary Examiner* — Tulsidas C Patel
*Assistant Examiner* — Rashad H Johnson
(74) *Attorney, Agent, or Firm* — Fish & Richardson P.C.

(57) ABSTRACT

A rotor for an electric machine includes a central hub with a cylindrical outer surface. A plurality of elongate spacers are affixed to the central hub at its outer surface. The spacers are circumferentially spaced apart from each other and extend axially along the outer surface of the central hub. A plurality of permanent magnets reside on the outer surface between the spacers. The magnets define at least two magnetic poles of the rotor. A metallic shield surrounds an outward facing surface of the permanent magnets and spacers to shield the magnets from high frequency magnetic fields that would cause eddy currents, and thus magnet heating. The metallic shield includes a metallic foil. A carbon fiber retaining sleeve surrounds an outward facing surface of the metallic shield. The carbon fiber sleeve is configured to retain the magnets to the central hub during operation of the electric machine.

22 Claims, 6 Drawing Sheets

(56) References Cited

U.S. PATENT DOCUMENTS

| | | | |
|---|---|---|---|
| 6,750,580 B2 * | 6/2004 | Lai | H02K 1/278 |
| | | | 310/156.28 |
| 6,822,359 B2 | 11/2004 | Joho | |
| 6,897,587 B1 | 5/2005 | McMullen et al. | |
| 6,963,151 B2 * | 11/2005 | Van Dine | H02K 1/278 |
| | | | 310/156.28 |
| 7,042,118 B2 | 5/2006 | McMullen et al. | |
| 7,781,932 B2 * | 8/2010 | Jansen | H02K 1/278 |
| | | | 310/156.08 |
| 8,040,007 B2 | 10/2011 | Petrov et al. | |
| 8,698,367 B2 | 4/2014 | Sortore et al. | |
| 10,340,757 B2 * | 7/2019 | Arimatsu | H02K 1/274 |
| 2005/0140241 A1 | 6/2005 | Petersen | |
| 2012/0187794 A1 * | 7/2012 | Inoue | H02K 1/2773 |
| | | | 310/181 |
| 2015/0188369 A1 * | 7/2015 | Arimatsu | H02K 1/278 |
| | | | 310/156.28 |
| 2016/0028282 A1 | 1/2016 | Geis et al. | |
| 2016/0359394 A1 * | 12/2016 | Zheng | H02K 1/278 |
| 2018/0316247 A1 | 11/2018 | Andonian et al. | |

OTHER PUBLICATIONS

Final office action issued in U.S. Appl. No. 15/499,407 dated Sep. 17, 2020.

Merriam Webster Dictionary, Definition of Foil by Merriam-Webster, Obtained Sep. 2020 (Year: 2020).

Notice of Allowance in U.S. Appl. No. 15/499,407, dated Mar. 26, 2021, 14 pages.

Notice of Allowance in U.S. Appl. No. 15/499,407, dated Jan. 7, 2021, 14 pages.

* cited by examiner

ELECTRIC MACHINE HAVING A ROTOR WITH RETAINING SLEEVE

TECHNICAL FIELD

This disclosure relates to electric machines, such as motors and/or generators.

BACKGROUND

In electric machines capable of converting electrical power into mechanical power (motoring), mechanical power into electric power (generating), or both, losses generate heat in the system. For example, in electric machines having a rotor with permanent magnets, high frequency fields that enter the permanent magnets generate heat in the magnets. These high frequency fields can be generated, for example, by the slot opening harmonics and from the switching harmonics of the power electronics being used. The magnets are retained to a rotor hub with a metallic or composite sleeve, typically carbon fiber. While carbon fiber has a higher yield strength than metal, enabling higher rotational speeds of the rotor and enabling thinner sleeves, carbon fiber does not provide any harmonic filtering. Thus, losses are generated directly in the permanent magnets, and the carbon fiber is ineffective at conducting the resulting heat away from the permanent magnets and other parts of the rotor.

SUMMARY

The concepts herein encompass a rotor for an electric machine. The rotor includes a central hub with a cylindrical outer surface. A plurality of elongate spacers are affixed to the central hub at its outer surface. The spacers are circumferentially spaced apart from each other and extend axially along the outer surface of the central hub. A plurality of permanent magnets reside on the outer surface between the spacers. The magnets define at least two magnetic poles of the rotor. A metallic shield surrounds an outward facing surface of the permanent magnets and spacers. The metallic shield includes a metallic foil. A carbon fiber retaining sleeve surrounds an outward facing surface of the metallic shield. The carbon fiber sleeve is configured to retain the magnets to the central hub during operation of the electric machine.

The concepts herein encompass a method of making an electric machine rotor for an electric machine. According to the method a plurality of permanent magnets are assembled onto an exterior cylindrical surface of a rotor hub to define at least two poles of the rotor. Non-magnetic, metallic foil is wrapped over the permanent magnets and the rotor hub. Carbon fiber is wrapped over the metallic foil to form a carbon fiber retaining sleeve configured to radially retain the permanent magnets during operation of the electric machine.

The concepts can include some, none or all of the following features. For example, the spacers can be non-magnetic and metal. The metallic shield can be a plurality of layers of metallic foil. The metallic foil can be metallic foil tape. The metallic foil can be non-magnetic. In certain instances, the metallic foil is aluminum, copper, aluminum alloy or copper alloy. In certain instances, the metallic shield contacts the ends of the central hub. The central hub can include end plates and each spacer can contact both end plates of the central hub.

The details of one or more implementations are set forth in the accompanying drawings and the description below.

Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
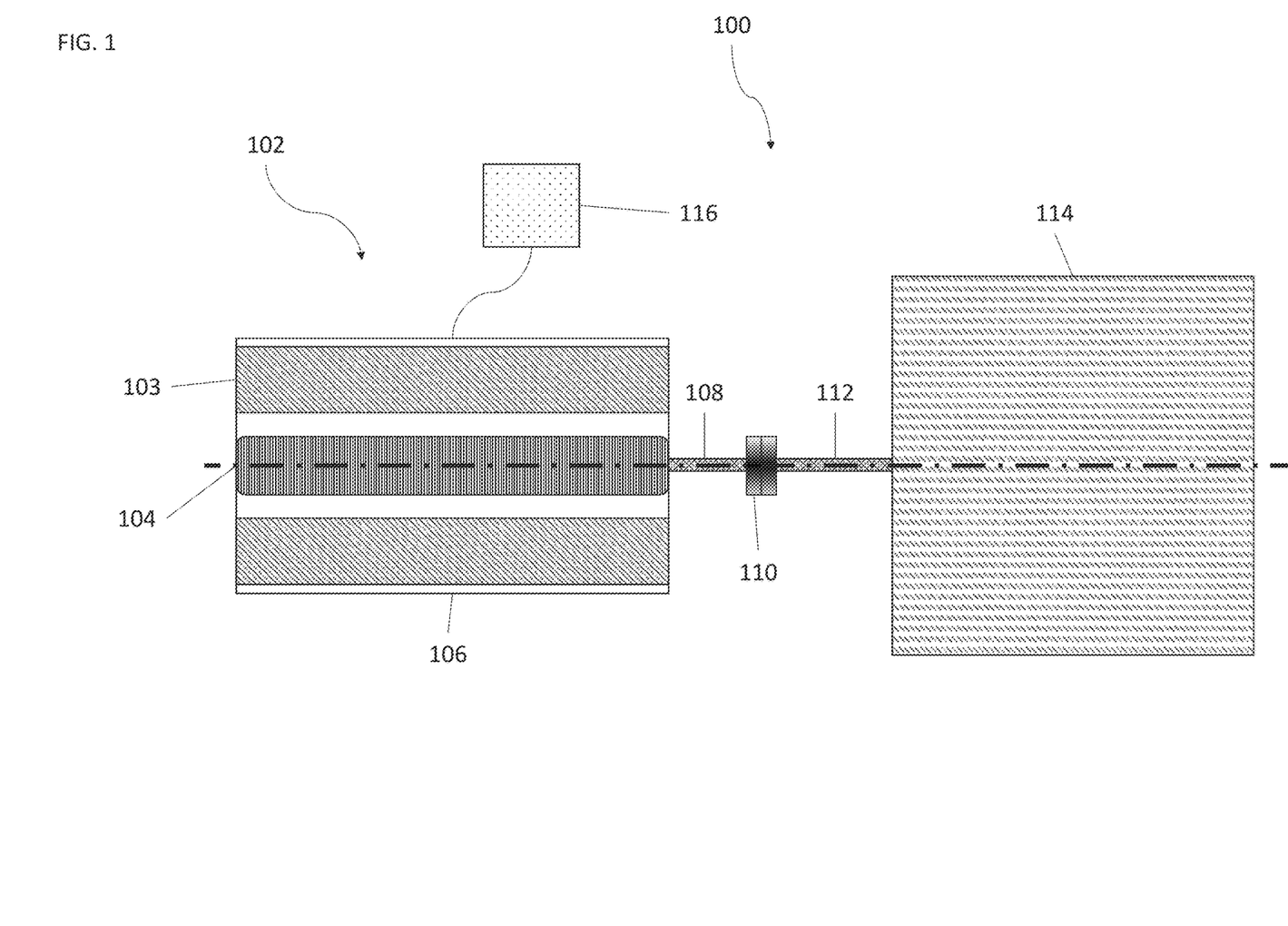
FIG. 1 is a schematic side, half cross-sectional diagram of an electric machine connected to driven component and/or prime mover.

FIG. 1 shows an example of an electro-mechanical system 100. The electro-mechanical system 100 includes an electric machine 102, power electronics 116, and a companion device 114. The electric machine includes a stationary electric machine stator 103, an electric machine rotor 104, an enclosure 106, and a rotor shaft 108. The electric machine 102 is connected to the companion device 114 by a coupling 110 that connects the rotor shaft 108 to the companion device shaft 112. In certain instances, the rotor shaft 108 can be integral to the rotor 104 or it can be an additional component, such as an extension, coupled to the rotor 104.

In some implementations, electric machine 102 can be a generator and companion device 114 can be a driver, such as a gas turbine or diesel engine. In a generator configuration, the driver turns the companion device shaft 112 to transfer torque through the companion device shaft 112, the coupling 110, the electric machine rotor shaft 108, and the electric machine rotor 104. In a directly coupled configuration, the companion device shaft 112 and rotor shaft 108 are directly coupled to rotate at the same speed, in the same direction. In some implementations, the companion device can be part of or installed on the rotor shaft 108 (i.e., with rotor shaft 108 and companion device shaft 112 coextensive or integral). In some implementations, a gearbox may be utilized to adjust the speed of the electric machine rotor shaft 108 in relation to the companion device 114. In the generator configuration, the electric machine rotor 104 induces a current in the windings of the electric machine stator 103 as the electric machine rotor 104 rotates. The current in the windings is sent to the power electronics 116 where it can be conditioned and sent to other equipment or a power grid. The conditioning, in certain instances, involves changing the voltage of the current and synchronizing the frequency of the current with the power grid.

In some implementations, electric machine 102 can be a motor and companion device 114 can be a driven machine, such as a pump or compressor. In a motor configuration, electric machine 102 turns the rotor shaft 108 to transfer torque from the electric machine rotor 104 through the rotor shaft 108, the coupling 110, and the companion shaft 112 to turn the companion device 114. As above, the rotor shaft 108 and companion shaft 112 can be directly coupled to rotate at the same speed, in the same direction. In some implementations, the companion device can be part of or installed on the rotor shaft 108 (i.e., with rotor shaft 108 and companion device shaft 112 coextensive or integral). In some implementations, a gearbox may be utilized to adjust the speed of the rotor shaft 108 in relation to the companion device 114. In the motor configuration, current is passed through the windings of the electric machine stator 103 by the power electronics 116. The power electronics 116 condition and adjust the power going into the electric machine stator 103. The current creates a magnetic field that imparts torque into the electric machine rotor 104, causing the electric machine rotor 104 to rotate.

In some implementations, the electric machine 102 can be switched between a generator mode and a motor mode. For example, electric machine 102 may act as a motor driving a pump as the companion device 114. The pump can move a fluid, for example, from a low elevation to a high elevation, from a low pressure to a high pressure, or otherwise. At other times, fluid may flow through the pump (companion device 114) from the higher elevation/pressure to the lower elevation/pressure. The fluid flow could then turn the pump (companion device 114) and the electric machine rotor 104 causing electric device 102 to act as a generator. In this implementation, the power electronics 116 are capable of switching between motor and generator mode.

In certain implementations, the electric machine rotor 104 rotates at high speed, i.e., 25,000 rotations per minute (rpm) or higher. Counter-acting the centrifugal forces in the rotor 104 is traditionally accomplished by a retaining sleeve surrounding the permanent magnets and other central components of electric machine rotor 104. Traditional high-strength metallic retaining sleeves act to contain the components of electric machine rotor, filter high frequency fields induced by the stator coils, and transfer heat away from the rotor. Unfortunately, traditional metallic high-strength sleeves need to be quite thick and heavy and made from very high strength, non-magnetic materials to have sufficient strength to counter-act the centrifugal force of the rotating rotor, especially with high speed rotors, increasing the weight and moment of inertia of the rotor. The increase in weight and inertia limits the speed rotational capabilities of the rotor, and the material selection and processing devices increase costs. In recent years, carbon fiber sleeves have been utilized. Carbon fiber is lighter and stronger than traditional metallic high-strength sleeves and allows for higher speed rotors. And while carbon fiber costs more per unit weight than non-magnetic high strength materials, use of much less material by unit weight and the simple processing offer significant cost advantages. Unfortunately, carbon fiber sleeves do not filter high frequency fields from the magnets, causing heat build-up within the rotor. Carbon fiber is also a poor thermal conductor as well, further compounding the heat build-up in the rotor.

In certain instances, the concepts herein are applicable to AC synchronous electric machines that utilize an electromagnetic stator 103 and permanent magnets of alternating polarity in the electric machine rotor 104. AC synchronous motors utilize the alternating current of the power supply to change the polarity of the stator coils. As current flows through the stator coils, it produces alternating magnetic fields that interact with the permanent magnets in the electric machine rotor 104 to produce torque. A synchronous generator works by rotating the electric machine rotor 104 to induce an alternating current in the stator windings. As the name implies, synchronous motors and generators have an operational rotational speed that is synchronized with the power line frequency. That is, if a synchronous generator is rotating at 3600 RPM (60 Hz), then the AC power produced would have a frequency of 60 Hz. In some implementations, a variable frequency drive (VFD) may be included in the power electronics 116 and used to adjust the speed of the synchronous motor. Synchronous generators/motors can utilize/produce single or multiphase power. Synchronous motors and generators are very efficient and tend to be utilized for high power applications. The electric machine rotor 104 discussed in this disclosure can be utilized for synchronous electric machines.

Figure 2A:
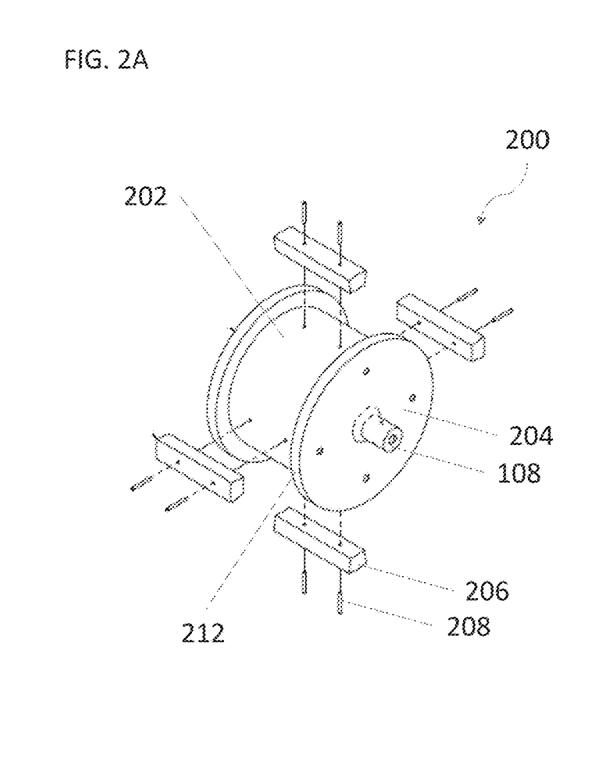
FIGS. 2A-2B are schematic exploded perspective views of an example central rotor hub.
Figure 2B:
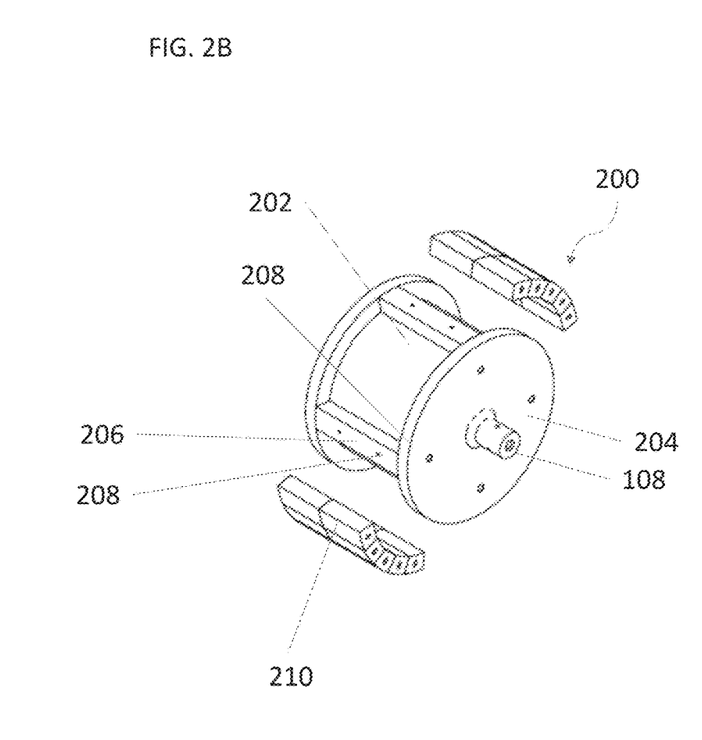

FIG. 2A shows a central rotor hub 200 of the electric machine rotor 104. The central hub 200 is cylindrical in shape with a generally circular cross section and has a cylindrical outer circumferential surface 202. A hub end plate 204 resides at each end of the central hub 200. Each hub end plate 204 has a diameter greater than the central hub 200 itself. Elongate spacers 206 are affixed to the rotor hub 200 on the outer surface 202, extending axially along the outer surface 202. FIG. 2A shows the spacers 206 attached with dowel pins 208, but they could be attached in another manner. The spacers 206 are constructed of a non-magnetic material. In certain instances, the spacers 206 are metal (entirely or substantially), such as aluminum (or alloys thereof), non-magnetic stainless steel, and/or another metal, to facilitate heat transfer through the rotor 104. The hub end plates 204 have the shaft 108, opposite the central hub 200. The shaft 108 is centered on the hub end plate 204. As shown in FIG. 2B, curved permanent magnets 210 are installed on the outer surface 202 of the central hub 200 between the spacers 206. The magnets 210 can be unitary or circumferentially segmented and, in certain instances, also or alternatively axially segmented to facilitate construction. The permanent magnets 210 are manufactured to have a curvature on their inner diameter that is equal to the diameter of the outer surface 202 of central hub 200. In certain instances, the curvature is within ±0.025 mm of the curvature of the outer surface 202 of the central hub 200. The curvature on the outer diameter of the permanent magnets 210 can likewise be, for example ±0.025 mm, to form a uniform curved outer surface. Neither the inner or outer surface of the magnets 210 need be machined (e.g., ground, cut or otherwise shaped), and particularly, the outer surface of the magnets 210 need not be machined to a smooth surface after installation to the central hub 200. In certain instances, the central hub 200 is constructed with magnetic steel (entirely or substantially). In some implementations, adhesive, clamps or other methods may be used to attach the magnets 210 to the hub 200 during assembly.

Figure 3:
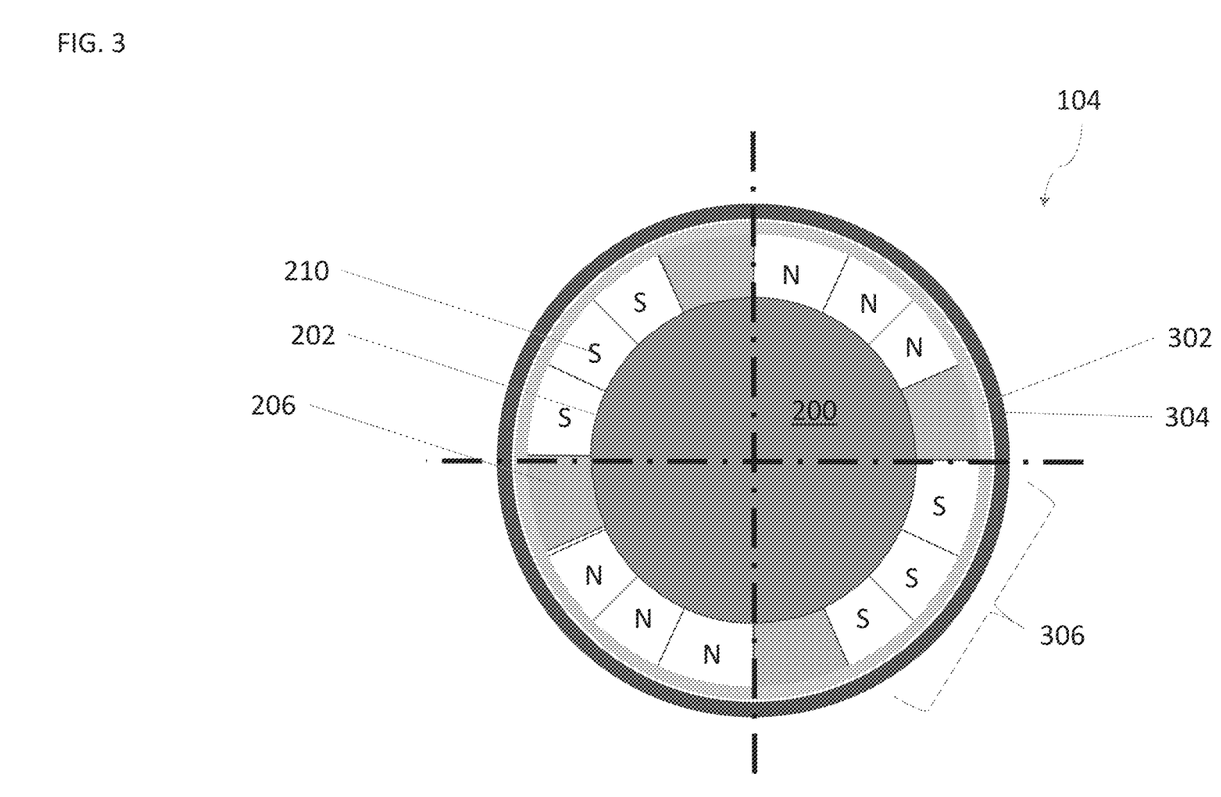
FIG. 3 is a schematic axial, cross-sectional view of an example electric machine rotor.

FIG. 3 shows a cross-sectional view of the electric machine rotor 104 perpendicular to the axis of rotation. At the center is the central hub 200. Although depicted as a solid, in certain instances, the central hub 200 can be hollow. The spacers 206 are equally circumferentially spaced apart around the central hub 200, and extend axially into contact with the hub end plates 204. Multiple magnets 210 are placed between the spacers 206 along the surface 202 of central hub 200. Metallic foil 302 surrounds the magnets 210 and the spacers 206. A carbon fiber retaining sleeve 304 surrounds the metallic foil 302.

As shown in FIG. 3, the groups 306 of magnets define alternating magnetic poles of the rotor, e.g., at least a north and south pole and in some instances, multiple north and south poles.

The spacers 206 serve several functions. First, they separate the groups of magnets 306 from one another and circumferentially retain the magnets 210 (i.e., prevent the magnets 210 from moving circumferentially around the central hub 200 due to acceleration/deceleration of the rotor and the associated magnetic torque). Because of the spacers 206, the outer surface 202 of the central hub 200 need not be faceted to circumferentially retain the magnets. Having a simple curved, not faceted, outer surface 202 saves the cost of machining or otherwise forming the facets. Second, during operation of the electric machine, the spacers 206 help mitigate eddy current formation in the permanent magnets 210, and because they are thermally conductive, help direct heat away from the magnets during operation. In particular, the spacers 206 are in conductive heat transfer with the end plates 204 and the metallic foil 302 to conduct heat in the magnets 210 to these elements.

The metallic foil 302 can be a single layer or multiple layers, and can be conveniently applied by hand around the outwardly facing surface of the magnets 210 and spacers 206 without need of a press or some other metal forming tool. In certain instances, the foil itself is 0.5 mm thick or thinner, and can be wrapped in multiple layers to achieve greater thickness. Aluminum or copper (or alloys thereof) foil is suitable, due in part to its high electrical conductivity, high thermal conductivity and it being non-magnetic, but other metals would also work. In operation of the electric machine, the metallic foil 302 acts as a harmonic filter to the permanent magnets 210 by eddy currents being generated in the foil 302 that reject high frequency fields from entering the magnets and generating losses. Also, because it is thermally conductive, the foil 302 acts to direct heat away from the magnets 210. The thickness of the metallic foil 302, or if multiple layers, the total thickness of the layers of metallic foil 302, can be determined based on the predicted frequency and amplitude of the harmonics expected during operation, the switching frequency of the power electronics during operation, and the expected heat generation during operation. The metallic foil 302 is electrically conductive along the axial length of the rotor 104, as well as circumferentially, to provide the eddy current conduction path. The metallic foil 302 does not need to provide structural support to the rotor 104 or substantively counteract the centrifugal forces of the components of the rotor 104 (e.g., to retain the magnets). In certain instances, the metallic foil 302 can include a single piece sized to extend the entire axial length of the central hub 200 and the magnets 210, or the metallic foil 302 can be a narrower strip of foil tape that is wrapped helically, or in adjacent bands, around the central hub 200 and the magnets 210 to extend the entire axial length. In certain instances, the metallic foil 302 directly contacts the magnets 210 and spacers 206 to conductively transfer heat away. In certain instances, the metallic foil 302 extends over or otherwise contacts the hub end plates 204 to effectively conductively transfer heat in the foil 302 to the hub end plates 204.

The carbon fiber sleeve 304 is wrapped around the layer of metallic foil 302 and cured in-place. The carbon fiber sleeve 304 is configured to contain the magnets 210 on to the central hub 200 as the rotor 104 rotates. The carbon fiber is a composite of carbon fiber and resin wrapped directly onto the layer of metallic foil 302, and can be one or multiple layers of monofilament, multifilament or woven carbon fiber. The carbon fiber can include additional fiber types, e.g., aramid. The number of layers in the sleeve 304 and the arrangement of the fibers is selected based, at least in part, on the centrifugal forces that must be supported. The carbon fiber sleeve 304 is wrapped tightly enough to compress the metallic foil 302 against the magnets 210 to provide effective conductive heat transfer, and reduce or eliminate any substantial voids or air pockets. Notably, because the metallic foil 302 is ductile and the foil and carbon fiber are wrapped over the as-installed outer surface of the magnets 210 and spacers 206, the outer surface of the magnets 210 need not be machined to a tight-tolerance, smooth surface, since the wrapped arrangement can accommodate some degree in surface variation of the magnets 210 that could not be accommodated were the metal and sleeve slip fit over the magnets. The outer surface of the carbon fiber sleeve 304 can be machined (e.g., ground, cut on a lathe, or otherwise), as needed, to produce a tight-tolerance, smooth surface that enables a small air gap to the stator.

Figure 4:
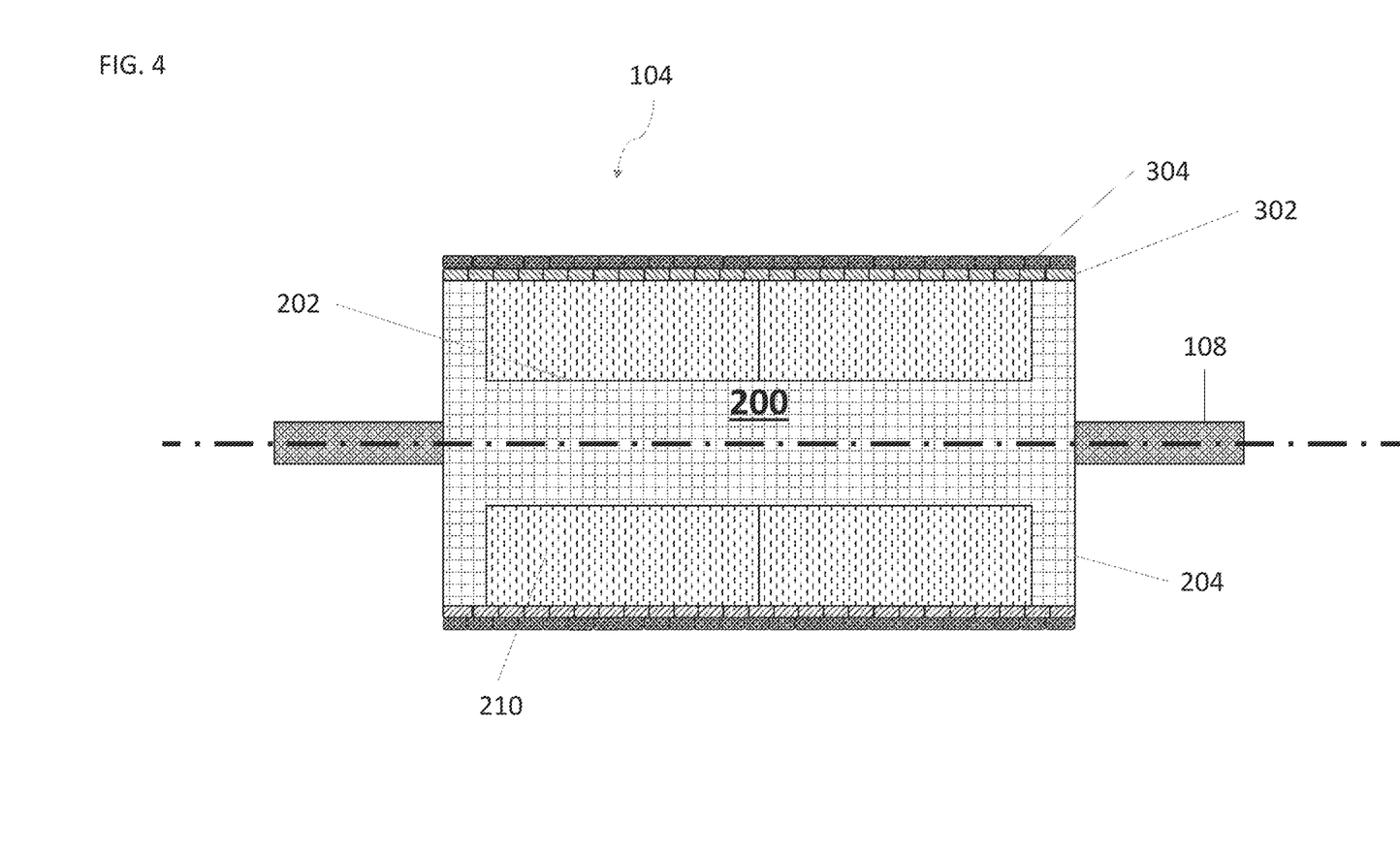
FIG. 4 is a schematic side, half cross-sectional view of an example electric machine rotor.
Figure 5:
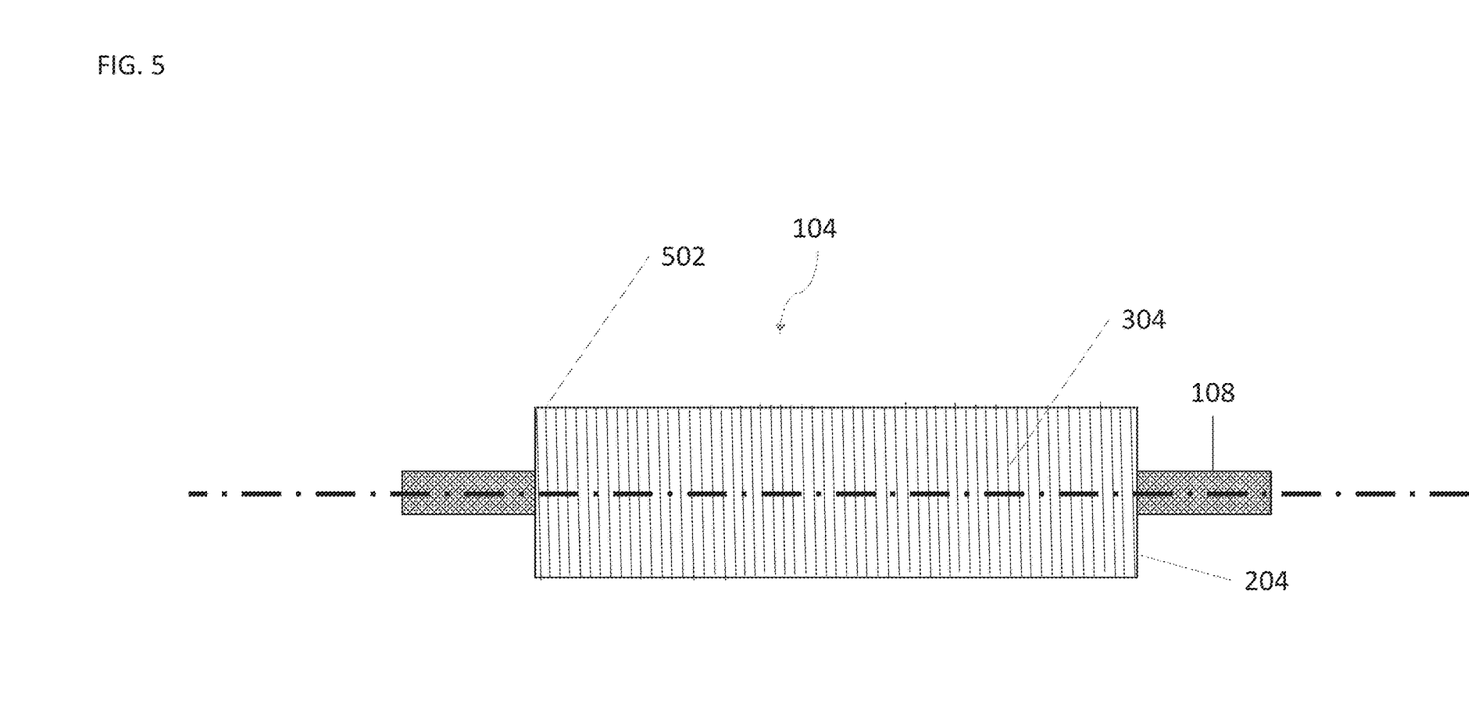
FIG. 5 is a schematic side view of a completed electric machine rotor assembly.

FIG. 4 shows a cross sectional view of the rotor 104 parallel to the axis of rotation. The implementation shown in FIG. 4 shows the metallic foil 302 applied as a tape strip. FIG. 5 shows a completed rotor 104 with a carbon fiber sleeve 304 made up of a helically wrapped strip of carbon fiber. Once cured, the outward surface 502 of the carbon fiber sleeve 304 can be cut (e.g., ground, machined or otherwise) to have a tight tolerance cylindrical outer surface so as to enable a small air gap with the stator and to balance the rotor 104.

Figure 6:
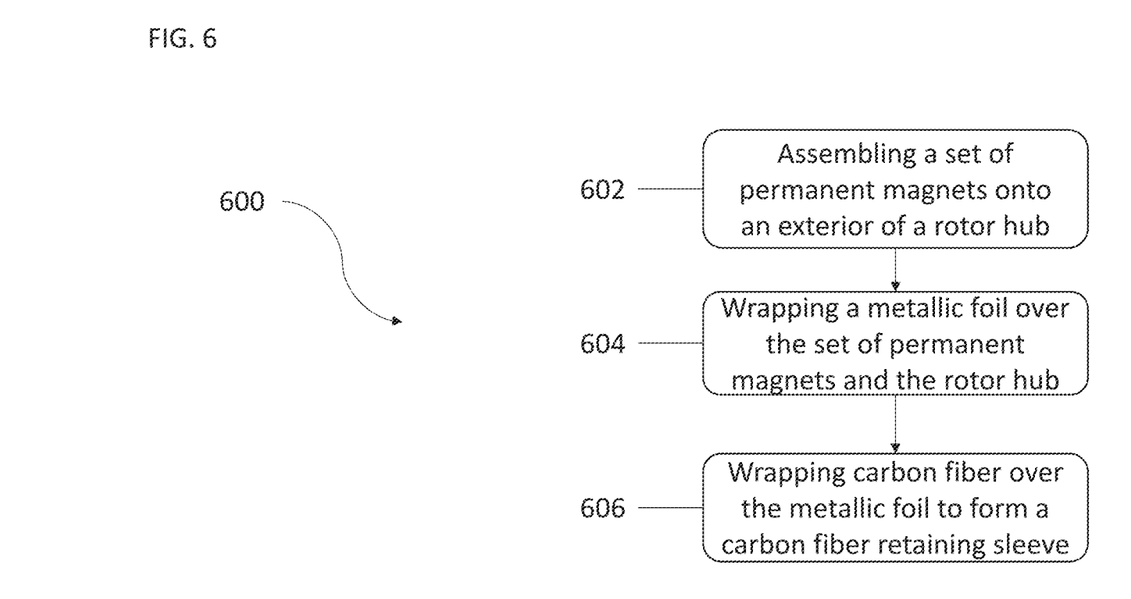
FIG. 6 is a flowchart showing an example method for assembling an electric machine rotor.

FIG. 6 shows a flowchart with example method 600 for assembling rotor 104. At 602, permanent magnets 210 are assembled onto an exterior of a rotor central hub 200. The spacers 206 can be mounted to the central hub 200 prior to the permanent magnets 210 being installed. At 604, a metallic foil 302 is wrapped over the set of permanent magnets and the rotor central hub 200. Wrapping a metallic foil involves wrapping the metallic foil directly over an outward facing surface of the magnets 210 and spacers 206. At 606, carbon fiber is wrapped over the metallic foil 302 to form a carbon fiber retaining sleeve 304 configured to radially retain the magnets 210 at a maximum operational rotational speed. Wrapping carbon fiber involves wrapping the carbon fiber directly over an outward facing surface of foil. The matrix, holding the carbon fibers together is, in certain instances, thermoplastic (e.g., polyether ether keytone—PEEK or another thermoplastic) or thermoset (e.g., epoxy or another thermoset) resin. In some implementations, a monofilament or multifilament axial strand of carbon fiber is wrapped helically over the metallic foil from a first axial end of the assembly of permanent magnets to an opposing, second axial end of the permanent magnets; That is, the helical wrap goes from one hub end plate 204 to the other hub end plate 204. After the carbon fiber sleeve 304 in installed, the rotor 104 is cured and machined to have a cylindrical outer surface, and balanced.

A number of implementations have been described. Nevertheless, it will be understood that various modifications may be made. Accordingly, other implementations are within the scope of the following claims.

What is claimed is:
1. A rotor comprising:
a central hub with a cylindrical outer surface;
a plurality of elongate spacers affixed to the cylindrical outer surface of the central hub, the spacers circumferentially spaced apart from each other and extending axially along the outer surface of the central hub;
a plurality of permanent magnets on the outer surface between the spacers, the plurality of permanent magnets defining at least two magnetic poles of the rotor;
a metallic shield surrounding an outward facing surface of the permanent magnets and spacers; and
a retaining sleeve surrounding an outward facing surface of the rotor and the metallic shield, the retaining sleeve configured to retain the magnets to the central hub during operation of the rotor.

2. The rotor of claim 1, where the spacers are non-magnetic and metal.

3. The rotor of claim 1, where the metallic shield comprises a metallic foil.

4. The rotor of claim 3, where the metallic shield comprises a plurality of layers of metallic foil.

5. The rotor of claim 3, where the metallic foil comprises metallic foil tape.

6. The rotor of claim 3, where the metallic shield is non-magnetic.

7. The rotor of claim 3, where the metallic shield is aluminum, copper, aluminum alloy, or copper alloy.

8. The rotor of claim 3, where the metallic shield contacts a circumferential surface of at least one of the ends of the central hub.

9. The rotor of claim 8, where the central hub comprises end plates and each spacer contacts at least one of the end plates of the central hub.

10. The rotor of claim 3, where the metallic shield is metallic foil and contacts the outward facing surface of the spacers and permanent magnets.

11. The rotor of claim 1, where the retaining sleeve comprises a fiber and resin composite.

12. The rotor of claim 11, where the composite comprises carbon fiber composite.

13. The rotor of claim 1, where at least one of the spacers is attached to the cylindrical outer surface by a fastener.

14. The rotor of claim 1, where the cylindrical outer surface of the central hub is a continuous cylindrical outer surface.

15. An electric machine, comprising:
a stator; and
a rotor, the rotor comprising:
a rotor hub with a cylindrical outer surface;
a plurality of non-magnetic spacers on and contacting the cylindrical outer surface of the rotor hub;
a plurality of permanent magnets arranged on the cylindrical outer surface between the spacers, the plurality of permanent magnets defining at least two magnetic poles of the rotor;
a metallic shield surrounding an outward facing surface of the permanent magnets and spacers; and
a retaining sleeve surrounding the rotor.

16. The electric machine of claim 15, further comprising a non-magnetic metallic foil surrounding and contacting the permanent magnets and spacers.

17. The electric machine of claim 16, where the metallic foil extends past the ends of the plurality of permanent magnets to contact at least one of the ends of the rotor hub.

18. The electric machine of claim 16, where the metallic foil comprises a plurality of layers of metallic foil.

19. The electric machine of claim 15, where the retaining sleeve comprises a fiber and resin composite.

20. The rotor of claim 19, where the composite comprises carbon fiber composite.

21. The electric machine of claim 15, where the plurality of non-magnetic spacers is configured to prevent relative motion between the plurality of permanent magnets and the rotor hub.

22. A rotor comprising:
a central hub with a cylindrical outer surface;
a plurality of elongate spacers affixed to the cylindrical outer surface of the central hub, the spacers circumferentially spaced apart from each other and extending axially along the outer surface of the central hub, where the spacers are non-magnetic and metal;
a plurality of permanent magnets on the outer surface between the spacers, the plurality of permanent magnets defining at least two magnetic poles of the rotor;
a metallic shield surrounding an outward facing surface of the permanent magnets and spacers; and
a retaining sleeve surrounding an outward facing surface of the rotor, the retaining sleeve configured to retain the magnets to the central hub during operation of the rotor.

\* \* \* \* \*

UNITED STATES PATENT AND TRADEMARK OFFICE
CERTIFICATE OF CORRECTION

PATENT NO. : 11,081,918 B2
APPLICATION NO. : 15/499323
DATED : August 3, 2021
INVENTOR(S) : Andonian et al.

Page 1 of 1

It is certified that error appears in the above-identified patent and that said Letters Patent is hereby corrected as shown below:

In the Claims

In Column 8, Line 16, Claim 20, please delete "rotor" and insert -- electric machine --.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*